May 15, 1928.
F. P. BENJAMIN
1,669,893
RADIO RECEIVING SYSTEM
Filed Dec. 14, 1925
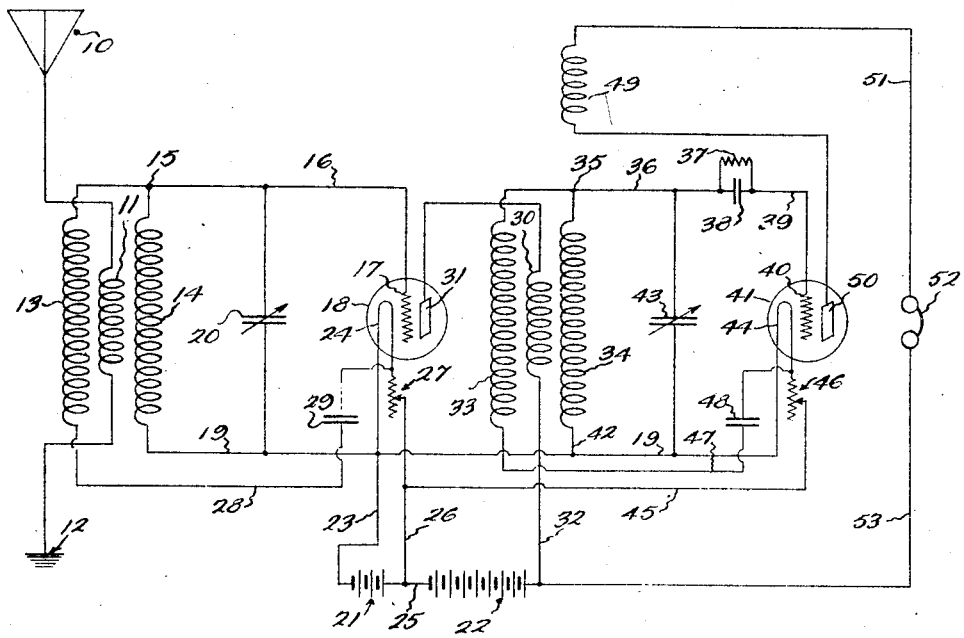
Inventor
F. P. Benjamin
By
Attorney Patented May 15, 1928.

1,669,893

UNITED STATES PATENT OFFICE.

FRED PARKER BENJAMIN, OF WATSEKA, ILLINOIS.

RADIO RECEIVING SYSTEM.

Application filed December 14, 1925. Serial No. 75,425.

This invention relates to radio receiving systems.

An important object of the invention is to improve the quality of reception by eliminating the usual howls, squeals and whistles often caused by the generation of eddy currents and also by the generation of harmonics.

A further object is to accomplish the above results without introducing losses and without the use of any neutralizing, balancing or bridging action or the like.

A still further object is to accomplish the desired results by increasing the efficiency of the action of the grids of electron discharge tubes by providing a freer flow of current thereto whereby more accurate reception is obtained, the means employed being adapted to minimize the generation of eddy currents and to filter out substantially all harmonics.

Other objects and advantages of the invention will become apparent during the course of the following description.

The single figure of the drawing is a diagrammatic view wherein for the purpose of illustration the invention is shown as applied to a system embodying one stage of radio frequency and a detector.

Referring to the drawing the numeral 10 designates the usual antenna which is connected to a coil 11 at the upper end thereof, the lower end of the coil being grounded as at 12. The coil 11 constitutes the primary of a radio frequency transformer which includes a pair of secondary coils 13 and 14, as shown. The secondary coils are shown as being connected at one end, as at 15, and a lead wire 16 is connected from the secondary coils to the grid 17 of an electron discharge tube 18. The opposite end of the secondary coil 14 is connected to a lead wire 19, as shown, and a variable condenser 20 is connected across the leads 16 and 19, in the usual manner.

The usual "A" and "B" batteries 21 and 22 of suitable voltages are provided, and the negative lead 23 from the "A" battery is connected to one side of the tube filament 24. A lead 25 is connected between the positive side of the "A" battery and the negative side of the "B" battery in the usual manner, and current is supplied to the filament of the tube from the positive side of the "A" battery through a lead 26 in which is connected the usual rheostat 27. As clearly shown, the lead 19 from the secondary coil 14 is directly connected to the negative side of the filament to constitute the grid return in the usual manner. The opposite side of the secondary coil 13 is connected to a lead 28 and a capacity 29 is interposed between this lead and the positive side of the "A" battery.

The stage of radio frequency described is coupled to the detector circuit to be described by a second transformer which includes a primary coil 30. One end of this coil is connected to the plate 31 of the tube 18 and the opposite end of the coil is connected by a lead 32 to the positive side of the "B" battery in the usual manner. The second transformer also includes a pair of secondary coils 33 and 34, as shown, and the coils are connected at one end as at 35. From the connection 35 a lead 36 is connected to the usual grid leak and condenser 37 and 38, from which a lead 39 extends to the grid 40 of a second electron discharge tube 41 which acts as the detector. The opposite end of the coil 34 is connected by a lead 42 to the wire 19, and a variable condenser 43 is connected across the leads 36 and 19. The wire 19 also is connected to the negative side of the filament 44 of the tube 41.

The negative side of the "A" battery is connected with the negative side of the filament 44 through a lead 45, one end of which is connected to the wire 26 while the opposite end is connected to the usual rheostat 46. The opposite end of the secondary coil 43 connects with a lead 47 and a fixed capacity 48 is interposed between the lead 47 and the positive side of the filament 44.

The detector circuit aside from the secondary coils of the transformer may be of any desired type and may employ a feed back coil 49 connected at one end to the plate 50 of the tube 41. The opposite end of the coil 49 will be connected by a lead 51 with one terminal of the phones or speaker 52 while the opposite terminal thereof will be connected by a wire 53 with the positive side of the "B" battery.

It has been found that the provision of the dual coils of the transformer provides multiple grid returns permitting a freer flow of current to the grids of the tubes, thus materially reducing the generation of eddy currents and greatly improving the quality of reception. It is believed that the fixed condensers 29 and 48 act as filters to eliminate harmonics, and the general effect of the circuit described is to eliminate or greatly minimize the usual howls, squeals and whistles. Thus only the desired reception is heard in the speaker, and the quality of this reception is materially improved.

The circuit illustrated is to be considered only as one embodiment of the invention, and it is to be understood that the connections of the leads from the secondaries of the transformers to the filaments of the tubes may be varied. In other words, the particular connections illustrated are not vital to the proper operation of the circuit, and the leads from the secondaries may be reversed or the fixed capacities 29 and 48 may be changed over to the negative leads of the filaments, if desired. The capacities of the condensers 20 and 43, and the number of turns of wire employed in making the transformers will of course, depend upon the range of frequencies which it is desired to receive. The invention has been designed particularly for use in connection with tuned radio frequency, but will operate efficiently in connection with other radio frequency types. The invention also is applicable to detector circuits as illustrated in the drawing and also to audio frequency circuits. It also has been found that the invention may be applied either to one tube of a multi-tube circuit or may be applied to all of the tubes thereof.

The use of the fixed condensers in the grid return has been found important, but these condensers are not critical. The secondaries of the transformers described may be wound independently upon their forms, or the secondaries of each transformer may be wound as a pair.

I claim:

1. In a radio receiving system including an electron discharge tube having a filament and grid therein, and a primary transformer coil, a pair of secondary transformer coils associated with said primary coil, one end of each of said secondary coils being connected to the grid of the tube, the other end of one of said secondary coils being connected to one end of the tube filament, and a capacity connected between the other end of said secondary coil and the opposite end of said tube filament.

2. The combination with a radio frequency circuit including an input coil, an electron discharge tube having a filament and grid therein, and a variable capacity connected between said grid and one end of said filament, of a pair of secondary coils arranged in inductive relation to said input coil, one end of each of said secondary coils being connected to said grid, the opposite end of one of said secondary coils being connected to one end of said filament, and a fixed capacity connected between the opposite end of the other of said secondary coils and the other end of said filament.

3. In a radio receiving system including an electron discharge tube having a filament and grid therein and a primary transformer coil, a pair of secondary transformer coils inductively associated with said primary coil, one end of each of said secondary coils being connected to the grid of the tube, the other ends of said secondary coils being connected to the ends of the tube filament respectively, and a capacity connected in series with one of said secondary coils.

In testimony whereof I affix my signature.

FRED PARKER BENJAMIN.